May 9, 1967  E. C. SWOGGER ET AL  3,318,555

AIRCRAFT FLIGHT CONTROL SYSTEM

Filed April 21, 1966  4 Sheets-Sheet 1

INVENTORS
EMERY C. SWOGGER
HARRIS L. WOODS
BY

ATTORNEY

INVENTORS
EMERY C. SWOGGER
HARRIS L. WOODS

ATTORNEY

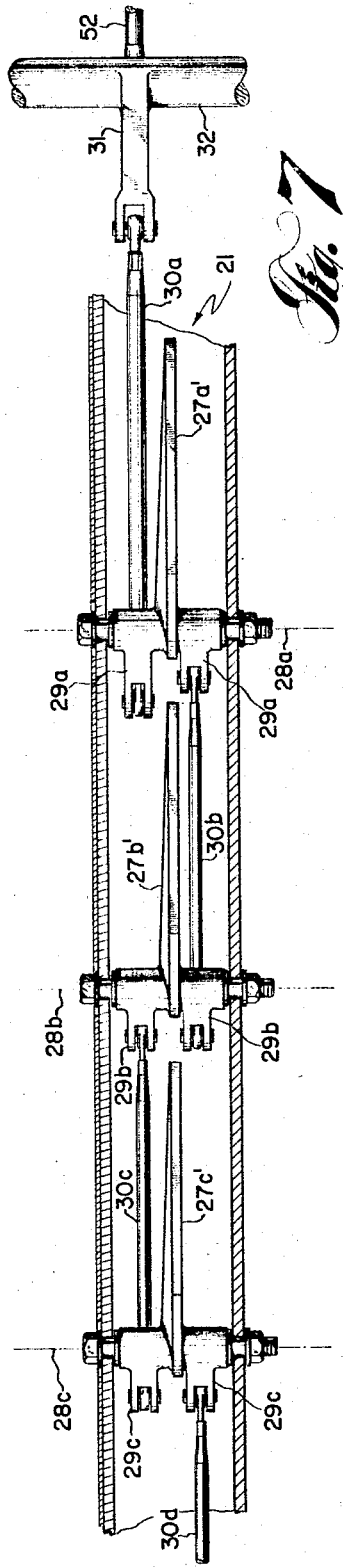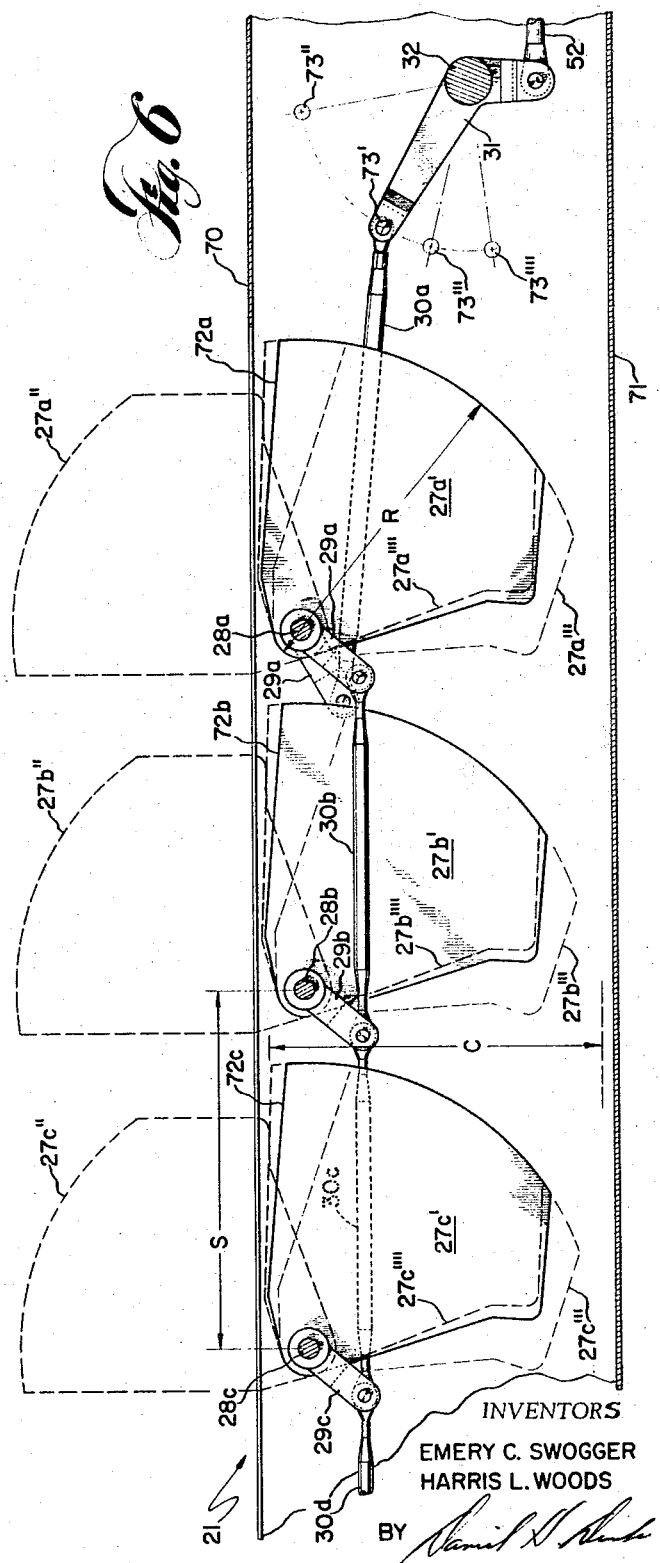

3,318,555
AIRCRAFT FLIGHT CONTROL SYSTEM
Emery C. Swogger, Columbus, and Harris L. Woods, Reynoldsburg, Ohio, assignors to North American Aviation, Inc.
Filed Apr. 21, 1966, Ser. No. 549,755
6 Claims. (Cl. 244—90)

This invention relates generally to aircraft, and particularly concerns improved apparatus for controlling the roll attitude of an airplane during flight.

Also, this is a continuation-in-part of our application Ser. No. 443,964, filed Mar. 30, 1965, now abandoned.

Winged aircraft have heretofore typically been provided with either conventional aileron elements or conventional aerodynamic spoiler elements, or combinations thereof, for effecting roll control during flight. Generally speaking, the conventional aileron elements are most effective for control of aircraft attitude during operation in comparatively high dynamic pressure flight situations; known spoiler elements, on the other hand, are particularly effective in connection with aircraft operation in low dynamic pressure flight situations. Even though known combined aileron and spoiler type aircraft flight control systems have proven satisfactory for effecting changes in the roll attitude of most aircraft, attempts to successfully obtain increased rates of roll and improved linearity of aircraft in-flight response as a function of a control input movement have been limited with such apparatus, and particularly with respect to manual or power-boost types of aircraft lateral flight control systems that must be operable bi-directionally from a neutral condition associated with laterally stabilized flight. We have discovered that both increased roll rates and improved linearity of response as a function of control input movements can be obtained by the practice of the invention described and claimed herein.

This invention basically concerns a manual (or power-boost) type of lateral flight control system wherein a pilot-operated control input means that is acted upon by aerodynamic feedback forces may be moved in alternate opposite directions from a neutral condition associated with laterally stabilized flight to effect changes in aircraft roll attitude. Movement of such input means causes simultaneous correlated movement of combined aileron means and spoiler means located in symmetrically-opposed wing outboard regions. The aircraft flight control system, however, is provided with a novel spoiler assembly means in each such wing outboard region to achieve the improved performance capability.

Each spoiler assembly means used in this invention is comprised of ganged spoiler plate elements that are positioned transverse to the aircraft longitudinal axis and supported for rotation about axes generally parallel to that axis in response to movement of the manual control input means. To achieve the increased roll moments, the individual spoiler plate elements each have a configuration that is essentially a right angled sector, have a maximum radial dimension that is substantially just less than the wing interior depth at the spoiler location, and are spaced relative to each adjacent element to provide a distance that substantially corresponds to such wing interior depth between adjacent rotational axes. In order to obtain the improved linearity of response with minimum drag, each spoiler assembly is positioned entirely interiorly of the wing upper and lower mold line surfaces in its neutral condition but can be rotated bi-directionally from that position as a function of manual control input movement. By a novel linkage and initial positioning arrangement the spoiler plate members are moved non-linearly slightly over 90° in one direction from their neutral condition to obtain a maximum reduction of aircraft lift with a desired degree of delayed aerodynamic effectiveness but less than one-half (½) that value in the opposite direction of aerodynamic ineffectiveness.

An important object of this invention is to provide an airplane with an aircraft lateral flight control system having an arrangement of aerodynamic spoiler-type elements that may be moved bi-directionally from a neutral position associated with laterally stabilized flight to effect changes in aircraft roll attitude at increased rates in low dynamic pressure flight situations.

Another object of this invention is to provide an airplane with an aircraft lateral flight control system having an arrangement of aerodynamic spoiler-type elements that may be moved in alternate opposite directions from a neutral position associated with laterally stabilized flight with aerodynamic loadings that improve the linearity of aircraft system response as a function of manual control input movements.

Another object of this invention is to provide a manual-type aircraft lateral flight control system with aileron-coordinated spoiler-type elements that may be operated bi-directionally from a neutral position associated with laterally stabilized flight to provide a degree of inherent non-aerodynamic effectiveness lag, to eliminate undesirable drag and yaw in connection with surface trimming operations, and to permit minor roll attitude correction in high dynamic pressure flight situations without establishing spoiler-induced loss of aerodynamic lift.

A still further object of this invention is to provide an aircraft lateral flight control system that may be installed within minimum space requirements, that may be operated in opposite directions from a basically neutral position without lost motion, that may be readily manufactured in an economical manner and with inherently low frictional resistance during actuation, and that has a high degree of operational reliability.

Other objects and advantages of this invention will become apparent from a consideration of the following description and drawings.

Figure 1:
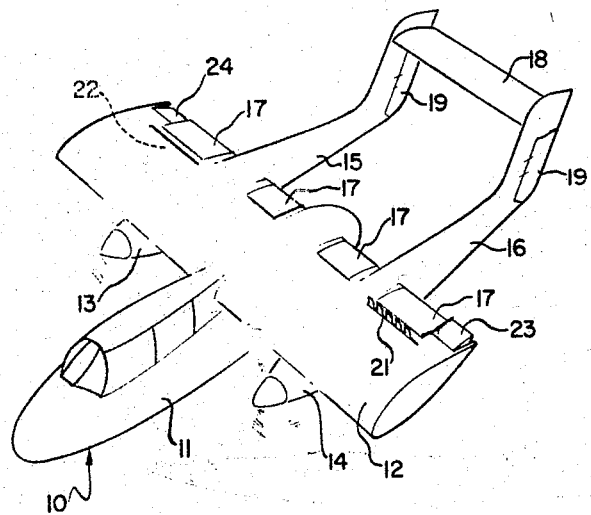
FIG. 1 is a perspective view of an airplane incorporating a preferred embodiment of the aircraft lateral flight control system of this invention.
Figure 2:
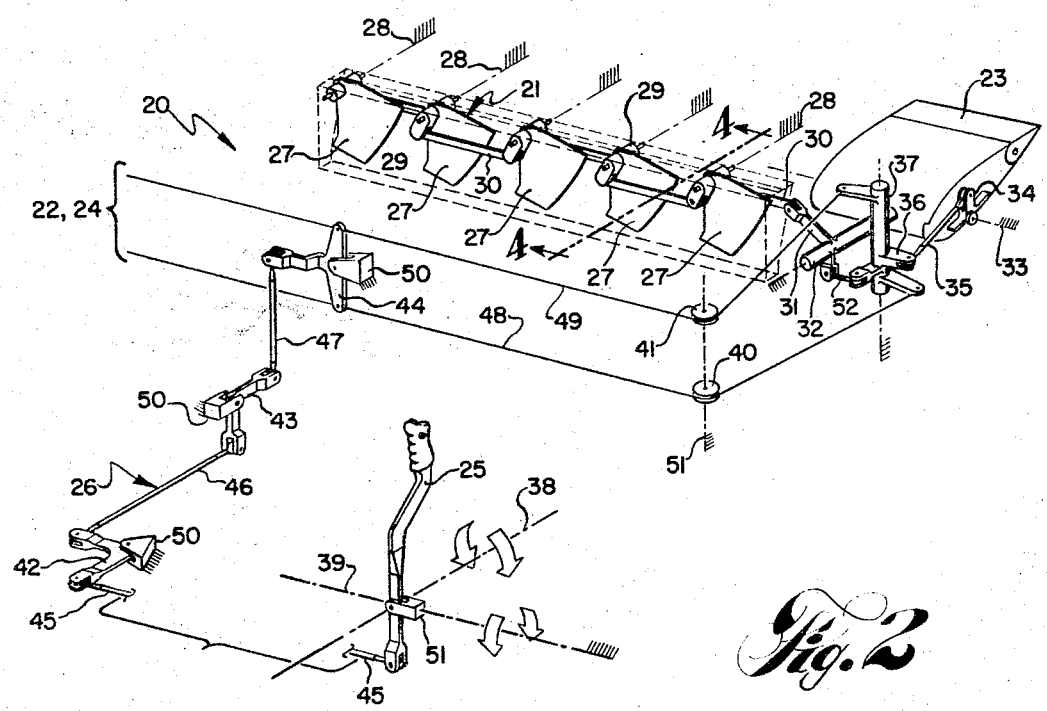
FIG. 2 is a perspective view of a portion of the aircraft lateral flight control system incorporated in the airplane of FIG. 1 showing the basic elements utilized in the construction of our invention.
Figure 3:
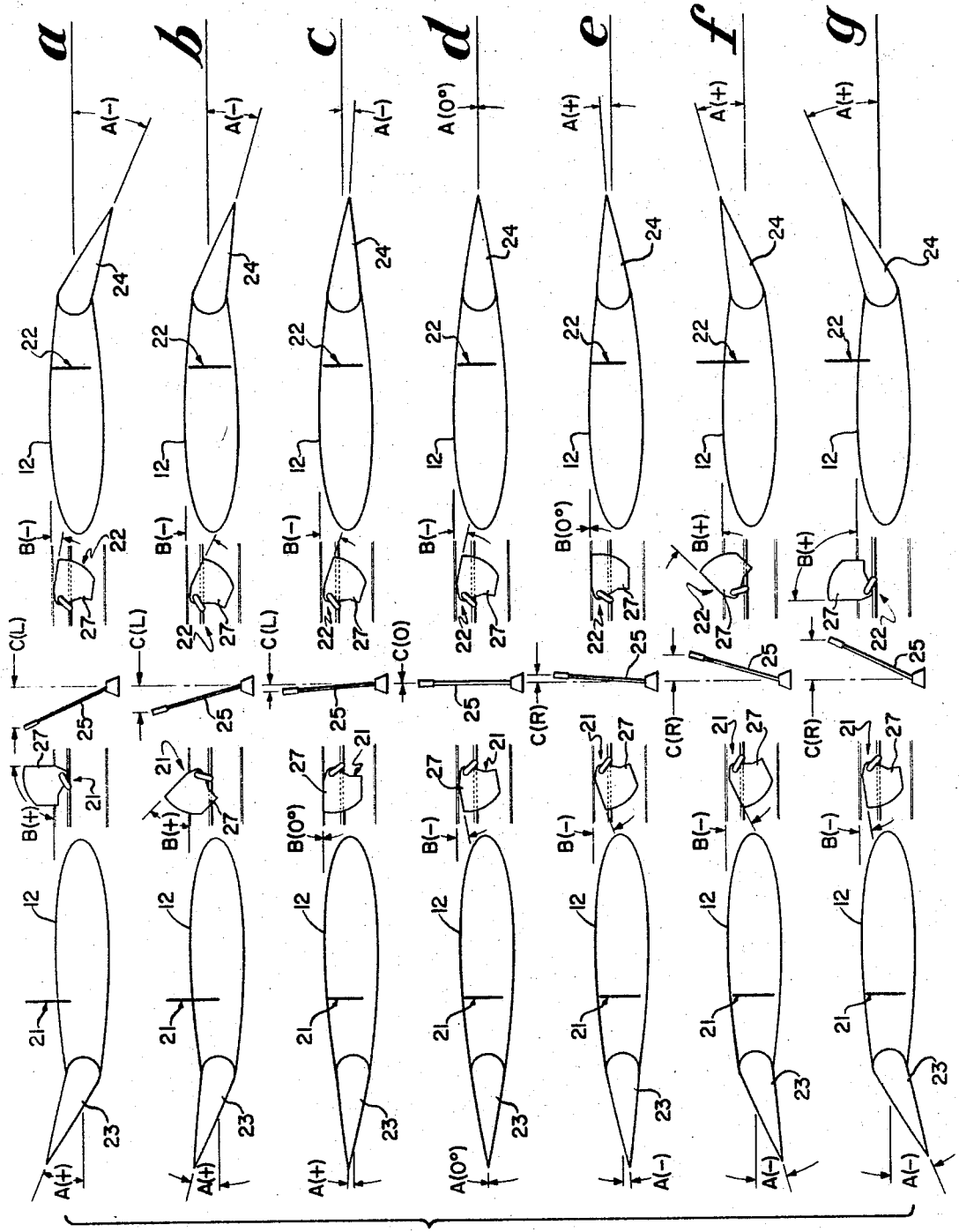
FIG. 3 illustrates various relative positions of the aerodynamic spoiler, aileron, and control stick elements included in the aircraft lateral flight control system of FIGS. 1 and 2 at different instances in a range of pilot-induced lateral flight control actions.
Figure 5:
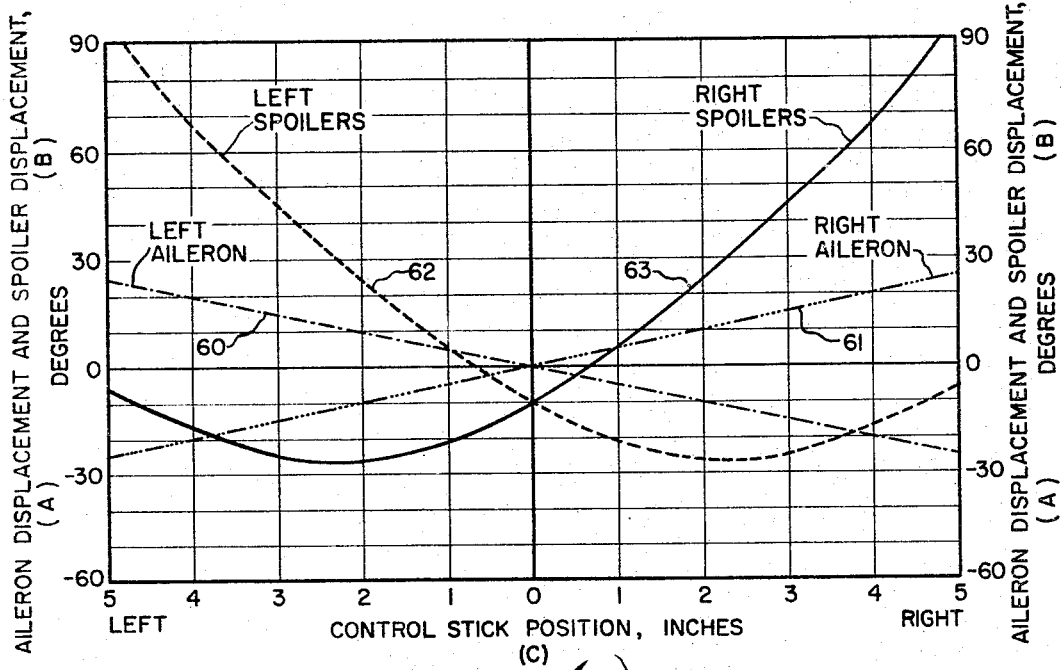

FIG. 5 graphically illustrates the relative positions of the aerodynamic spoiler, aileron, and control stick elements incorporated in the aircraft lateral flight control system of FIGS. 1 and 2 throughout the range of positions shown in FIG. 3; and FIGS. 6 and 7 are plan and front elevational views, respectively, of the spoiler assembly means illustrated in FIG. 2.

Broadly, the objects of this invention are realized in connection with an airplane aircraft lateral flight control system having separate control surface installations located in opposite outboard wing regions in symmetrical relation to each other, each of such installations being basically comprised of a spoiler assembly and aileron means combination. The aileron means is of conventional construction; however, it is cooperably connected with a ganged series of individual spoiler plate members that essentially constitutes the spoiler assembly. The individual spoiler plate members comprising the ganged spoiler assembly are each arranged so that the principal aerodynamically effective surface is normal to a spoiler rotational axis that is oriented parallel to the aircraft direction of flight; reaction forces imposed on the individual surfaces are thus absorbed by supporting structure and are not transmitted into the flight control system in opposition to the actuating force that moves the assemblies. Each of the spoiler assemblies is normally recessed entirely within the wing exterior surfaces, is coupled to the associated aileron means in lagging aerodynamic effectiveness relation relative to a neutral condition for actuation purposes, and may be actuated in opposite directions from a fundamentally neutral position wherein the spoiler plate member leading edges are spaced interiorly of the adjacent wing surface. The system also includes a typical pilot-operated control stick that is coupled to the spoiler assembly-aileron means combinations by a conventional mechanical linkage. The invention is ideally suited to manual actuation although power boost features, such as partial boost or full boost, may be utilized therewith if desired. The invention is particularly significant, however, with respect to manual and partial power boost-type system embodiments.

FIG. 1 illustrates an airplane 10 which incorporates a preferred embodiment of our invention. Such airplane includes a fuselage portion 11 and attached wing 12. Engine nacelles 13 and 14 are carried in symmetrically-opposed relation at the underside of wing 12 and are aerodynamically faired into rearwardly-extending boom portions 15 and 16, respectively. Nacelles 13 and 14 house the aircraft engines (not shown); conventional propeller assemblies are driven by the engines, preferably in counter-rotating relation. Slotted flap members 17 are provided in wing 12 for particularly improving the lift capabilities of airplane 10 in STOL (Short Take off and Landing) modes of aircraft operation. Horizontal elevator 18 is provided in airplane 10 to effect longitudinal attitude stability and for obtaining pitch control during flight. Rudders 19 are incorporated in the vertical stabilizer regions of airplane 10 to effect directional control during aircraft flight. The aircraft lateral flight control system of our invention is referenced generally as 20 and is basically comprised of spoiler assembly, aileron means, and control stick elements, together with an interconnecting drive linkage, in combination.

Lateral flight control system 20 includes a left hand installation and a right hand installation mounted in the wing outboard regions in symmetrically-opposite locations. Such installations include left hand and right hand spoiler assemblies 21 and 22 and left hand and right hand aileron means 23 and 24. System 20 further includes pilot-operated control stick 25 and the drive linkage 26 that mechanically couples control stick 25 to elements 21 through 24 in actuating relation.

As shown in the drawings, spoiler assembly 21 (and 22) is comprised of a ganged series of individual spoiler plate members 27, each arranged for rotational movement about a separate axis 28 that is parallel to the aircraft principal longitudinal axis and direction of flight. Spindle members 29 are connected to or made integral with the individual spoiler plate members 27 and provide the necessary lever arms for plate member actuation. Connecting rods 30 are provided to couple the spoiler plate members 27 and the lever arms of spindle members 29 in each spoiler assembly for simultaneous movement relative to axes 28. Actuation of each spoiler assembly 21 (and 22) is accomplished through the interconnection of arm 31 of spoiler drive bellcrank member 32. Other details will be developed with respect to the preferred embodiment of spoiler assemblies 21 and 22 of this invention in the discussion of FIGS. 6 and 7.

Aileron means 23 (and 24) are each secured to wing 12 in a conventional manner for rotation about an axis 33 that is oriented generally parallel to the aircraft principal transverse axis. A crank arm (horn member) 34 is attached to each aileron means and is coupled to an arm 36 of aileron drive bellcrank 37 through the connecting rod designated 35.

The actuation of drive bellcranks 32 and 37 to effect coordinated operation of the spoiler assembly 21 and aileron 23 combination, together with the similar combination of the opposite wing outboard region, is preferably, accomplished by means of control stick 25 through the drive linkage designated 26. Control stick 25 essentially rotates about both axis 38 and axis 39. Axis 38 corresponds to the longitudinal axis of the aircraft and is the axis of rotation for control stick 25 for accomplishing lateral flight control; axis 39, on the other hand, is essentially for pitch control only. Linkage 26, in the form shown in FIG. 2, is essentially comprised of pulley members 40 and 41, bellcrank members 42 through 44, connecting rods 45 through 47, and cables 48 and 49. Other linkage arrangements may be employed, however, and the linkage scheme shown in FIG. 2 is intended only as a typical arrangement for the preferred embodiment of our invention. Fixed supports 50 are essentially airframe-connected and are provided for the proper mounting of the illustrated bellcranks. Rotational supports 51 are also essentially airframe-connected and are provided for the proper mounting of control stick 25 and pulleys 40 and 41. Rod 52 (FIG. 2) serves to mechanically couple an arm of drive bellcrank 32 to a cooperating arm of drive bellcrank 37, and such components, together with the relative neutral positioning of spoiler plate elements 27, spindle members 29, and rods 30, function to establish the hereinafter discussed effectiveness lag as between spoiler and aileron elements of the system. Other arrangements for obtaining the mechanical functions of drive linkage 26 are known and may be preferred in some applications. Power boost devices, either for partial or full power boost, may be readily incorporated into system 20 whenever it is determined that the manual forces which can be applied to control stick 25 are generally inadequate for effective system operation.

FIG. 3 illustrates the various positions of the principal components of system 20 relative to each other throughout a range of pilot-induced lateral flight control actions for a typical airplane capable of acomplishing comparatively short take-off and landings. FIG. 3d discloses the preferred relation of the components for normal laterally stabilized flight. In the FIG. 3d illustration the chordal axes of aileron means 23 and 24 coincide with the chordal axis of wing 12. Aileron means 23 and 24 in the FIG. 3d condition do not modify aerodynamic loadings on wing 12 so as to induce a roll moment in either sense about the aircraft longitudinal axis. The angle A between each of the aileron means chordal axes and the wing member chordal axis is indicated as being zero degrees. See also FIG. 5, and the zero control stick position abscissa condition data provided therein. Additionally, the spoiler plate members 27 of spoiler assemblies 21 and 22 are completely recessed within the exterior surfaces of wing member 12 during level flight. It should be noted that the leading edge of each spoiler plate member 27 is arranged to coincide with the adjacent wing upper surface when the related spoiler assembly is at its threshold position of initially moving into the wing airstream. However, as shown in the FIG. 3d arrangement, it is preferred in the practice of our invention that during normal laterally stabilized flight such spoiler plate member leading edges have a negative angular position B relative to the wing adjacent surface. This feature of the invention basically provides for an effectiveness lag as between operation of the spoiler assemblies and the coordinated aileron means thereby permitting minor roll attitude corrections to be made without deploying either spoiler assembly 21 or 22 and without imposing undesirable yaw-producing drag forces on the wing and airplane during essentially level flight.

FIGS. 3c and 3e illustrate a degree of aileron means displacement that may be effected during flight without deploying either spoiler assembly 21 or spoiler assembly 22 into the airplane airstream. As shown in FIG. 3, for counter-clockwise roll attitude correction control stick 25 may be moved a distance C in a leftward sense to cause upward and downward deflection respectively of aileron members 23 and 24 through the angle designated A. In the FIG. 3c arrangement, each spoiler plate member 27 of assembly 21 is moved to a position wherein its leading edge coincides with the adjacent wing upper surface. Such displacement is indicated in FIG. 3c (and in FIG. 5) as having an absolute value of zero degrees. Because it is desired to provide aerodynamic effectiveness for each spoiler assembly 21 and 22 relative to its neutral condition for zero control stick position, the leading edges of the spoiler plate members 27 in coordinated assembly 22 are preferably initially or normally recessed within wing 12 by an angular displacement B that has a negative absolute value (see FIG. 5) with respect to the wing member 12 adjacent upper surface.

The arrangement of components shown in FIG. 3e is essentially the reverse of the arrangement shown in FIG. 3c and is developed by system operation to accomplish aircraft roll attitude correction in a clockwise sense about the aircraft longitudinal axis. In each instance, however, the actuation or displacement of the aileron means functions to increase aerodynamic lift on that wing portion experiencing downward aileron member displacement and functions to decrease aerodynamic lift on that wing portion member experiencing upward aileron element displacement.

FIGS. 3a and 3b (as well as FIGS. 3f and 3g) illustrate intermediately and fully deployed positions for the principal components of system 20 in connection with additional or major counter-clockwise roll attitude correction about the aircraft longitudinal axis. As shown in FIGS. 3a and 3b, control stick 25 may be displaced leftward by an additional distance (see FIG. 5) to cause further upward displacement of aileron means 23. Simultaneously, the individual spoiler plate members 27 of assembly 21 are moved into the airstream from the threshold condition of FIG. 3c so as to provide an additional loss of aerodynamic lift on the left half portion of wing 12. Although the angular displacement is referenced generally as B, in the FIGS. 3a and 3b illustrations the positions of the leading edge of spoiler plate members 27 are essentially 90° and 45°, respectively, wtih respect to the wing member 12 adjacent upper surface. Both angles are indicated as being of a positive or deployed value. It should be noted, however, that because of the drive linkage 26 operating characteristics and because of the physical relation of the cooperating arm portions of drive bellcranks 32 and 37 and connector rod 52, the leading edges of spoiler plate members 27 in assembly 22 remain completely recessed within the upper and lower surfaces of wing member 12 throughout the additional leftward control stick movement. Such assemblies, although having been changed in relative position, do not contribute to a reduction in aerodynamic lift on the right hand portion of wing member 12.

A like explanation applies to the positions of system components illustrated in FIGS. 3f and 3g. Such positions, however, relate to aircraft roll attitude correction in a clockwise sense relative to the aircraft longitudinal axis. The system functions essentially in an opposite or reverse manner to that described in connection with the FIG. 3a and 3b positions.

The above described relative positioning of components within system 20 may also be depicted graphically as in FIG. 5. In that illustration control stick position is plotted with abscissa values rightward and leftward of a laterally stabilized flight position. The resulting displacement of aileron means 23 and 24 is defined by the ordinate values of curves 60 and 61, respectively. Similarly, the resulting angular displacement of the leading edges of spoiler plate members 27 in each spoiler assembly relative to the wing adjacent upper surface is indicated by the ordinate values of curves 62 and 63. Curve 62 concerns the displacement of spoiler assembly 21; curve 63, on the other hand, relates to spoiler assembly 22.

As is shown in FIG. 3, and as measured by FIG. 5, in one actual installation of the preferred embodiment of our invention the spoiler plate member 27 leading edges are displaced below the wing upper surface by about ten degrees (negative) during normally laterally stabilized flight. Control stick 25 may be moved approximately ¾″ rightward or leftward (in the range of 1/10 to 1/5 the total available range of stick displacement in one direction from neutral) to effect minor roll attitude correction by the actuation of aileron elements 23 and 24 without moving either spoiler assembly above the coincident or zero degree reference line. Thus, the control stick 25 and ailerons means 23 and 24 accomplish minor corrections of roll attitude during flight without actuating the spoiler plates into the airstream and without imposing spoiler-originated drag forces upon the aircraft. Additional displacement of control stick 25 rightward or leftward causes further displacement of both aileron elements and both spoiler assemblies. The aileron elements continue to be displaced in a conventional fully linear manner. However, only the properly related spoiler assembly is moved into the adjacent airstream so as to accomplish a further reduction of aerodynamic lift on the desired wing portion. In the embodiment of the invention disclosed in the drawings, the components of system 20 are preferably designed so that a movement ratio of approximately 3:1 over the full actuation range is obtained as between a particular spoiler assembly individual plate member leading edge displacement and the related aileron displacement.

FIGS. 6 and 7 are provided to illustrate additional details with respect to the preferred arrangement of a spoiler assembly means such as 21 within wing 12. The position of assembly 21 in a neutral condition associated with normal laterally stabilized flight is shown using full-lines. The various dotted-line notations refer to alternate positions of the spoiler assembly elements at various different operating conditions. For reference purposes, the elements in the assembly are further identified with letter subscripts $a$, $b$, etc. to indicate their relative position in the sequence from drive bellcrank member 32. The various element alternate positions are designated further as $27a'$, $27a''$, etc. for clarity of description.

As shown in the drawings, the entire spoiler means assembly 21 is located within the limits of upper and lower mold line surfaces 70 and 71, respectively, of wing means 12 when positioned in the neutral condition associated with laterally stabilized flight. In such neutral condition, the leading edge 72 of each spoiler plate member 27 is positioned interiorly of upper mold line surface 70 by an angular displacement that is associated with accomplishing non-aerodynamic effectiveness lag as a function of initial actuation of spoiler assembly means 21 into the aircraft airstream to change aircraft roll attitude. As indicated in FIG. 5, the angular displacement is typically approximately 10° in the case of one actual embodiment of our invention.

Rotation of bellcrank 32 so that the pivot connection 73 between arm 31 and connecting rod 30a is moved from its neutral condition 73' to its full displacement condition 73″ is effective to rotate all of the plate members 27 from their neutral condition $27a'$, $27b'$, etc. through at least a right angle and to their fully deployed conditions designated $27a''$, $27b''$, etc. The total rotation about axes $28a$, $28b$, etc. is generally greater than a right angle in order to provide the compensation made necessary by the interior angular displacement of leading edges 72. In the case of the performance illustrated by FIG. 5, total movement in such one direction may be as much as approximately 105°. The degree of movement of control input means 25 associated with achieving the non-aerodynamic effectiveness lag is preferably from $\frac{1}{10}$ to $\frac{1}{5}$ of the full range of control input means movement in one alternate opposite direction from the neutral condition position associated with laterally stabilized flight. As indicated by FIG. 5, approximately $\frac{3}{4}''$ stick movement is utilized out of an available 5" range to move either right or left spoiler elements from a $-10°$ spoiler displacement position to a $0°$ spoiler displacement position in an actual embodiment of our invention. The $0°$ spoiler displacement corresponds to initial movement of the individual spoiler plate members into the aircraft airstream. Also, as shown in FIG. 6, movement of pivot connection 73 in an opposite direction to positions 73''' and 73'''' results in corresponding spoiler plate member movement entirely within the limits of upper and lower mold line surfaces 70 and 71 of wing means 12. Such extreme positions are illustrated in the drawings in connection with element 27a and are designated 27a''' and 27a'''', respectively.

Figure 4:
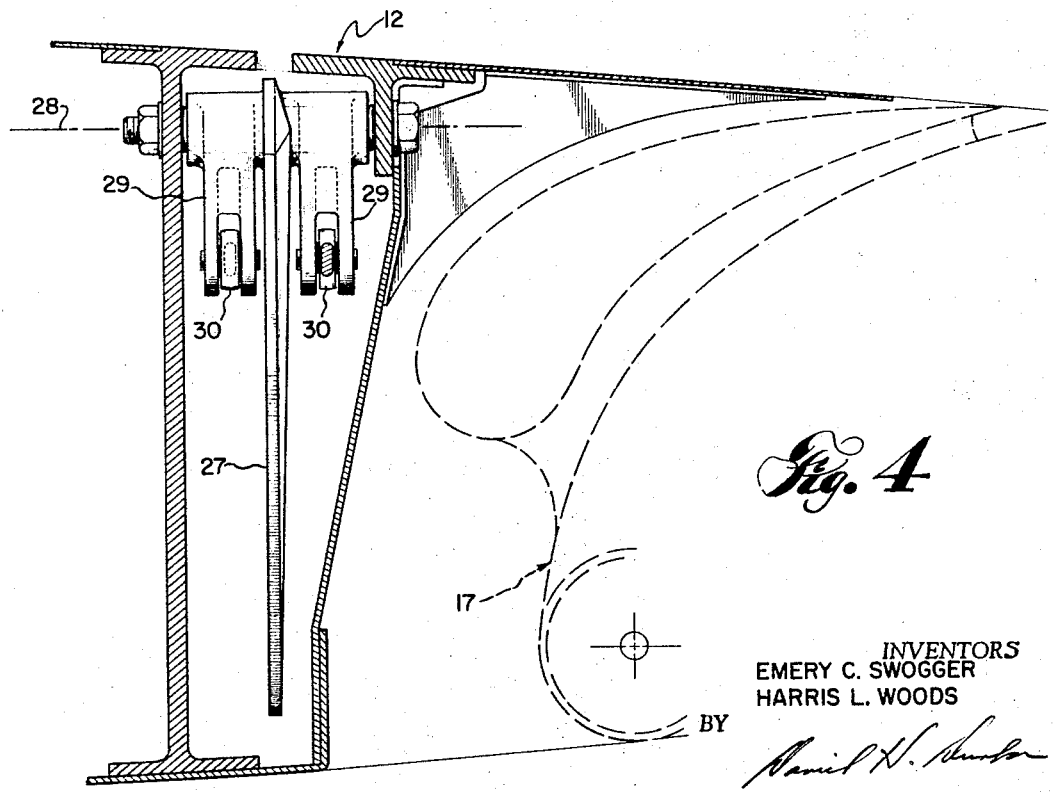
FIG. 4 is a sectional view taken at line 4—4 of FIG. 2.

In order to obtain increased roll rates we prefer that each spoiler plate member 27 be provided with a sector-like elevational configuration and that the configuration have a maximum radial dimension R consistent with bi-directional rotation with respect to the illustrated neutral condition. The radial dimension includes an allowance for integral spindle 29 and should ideally be just less than the clearance distance C between the adjacent wing means upper and lower mold line surfaces 70 and 71. In the drawings, the dimension C includes allowances for possible interference with adjacent structure such as is shown in FIG. 4. Also, to provide maximum continuity of extended spoiler surface along the wingspan, we prefer that rotational axes 28a, 28b, etc. be spaced apart by a distance D that is just greater than clearance distance C. The added allowance provides for assured clearance as between adjacent plate members 27 during actuation into the aircraft airstream in various flight conditions.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

We claim:

1. An aircraft flight control system for effecting changes in aircraft roll attitude about an aircraft longitudinal axis in response to manual control movements applied to a control input means, and comprising:
   (a) wing means having two outboard regions that are symmetrically-opposed relative to the aircraft longitudinal axis and that are each defined by upper and lower mold line surfaces,
   (b) control input means positioned for manual movement in alternate opposite directions from a neutral condition associated with normal laterally stabilized flight to change the roll attitude of said wing means,
   (c) aileron means located in each of said two opposed wing outboard regions and each positioned to be moved in alternate opposite directions from a neutral condition associated with normal laterally stabilized flight according to an essentially linear function of a control movement,
   (d) mechanical force-transmitting means connecting said aileron means and control input means together in a manner whereby manual movement of said control input means at all times results in correlated movement of each of said aileron means, and
   (e) spoiler assembly means having essentially flat aerodynamic lift-reducing surface members located in each of said wing means outboard regions transverse to the aircraft longitudinal axis and mechanically connected to said aileron means to be rotated at all times in alternate opposite directions about axes that are generally parallel to the aircraft longitudinal axis in correlated response to manual control movements applied to said control input means and said aileron means,
   one of said spoiler assembly means being rotated throughout a right angle to a position whereat said surface members are projected transversely above said wing means upper mold line surface when rotated fully in one direction from a neutral condition associated with laterally stabilized flight, the other of said spoiler assembly means being rotated entirely within the limits of said wing means upper and lower mold line surfaces in an opposite direction from said neutral condition and simultaneously with said one spoiler assembly means.

2. The invention defined by claim 1, wherein said spoiler assembly means are each moved within a non-aerodynamic effectiveness lag when rotated from said neutral condition to a position above said wing means upper mold line surface, said surface members each having a leading edge that is displaced at said neutral condition angularly interiorly of the adjacent wing means upper mold line surface to provide said effectiveness lag as said spoiler assembly means surface member leading edges are rotated from said neutral condition position, through said angular displacement, and to a position initially above said wing means upper mold line surface.

3. The invention defined by claim 2, wherein said surface member leading edge angular displacement at said neutral condition is approximately $10°$.

4. The invention defined by claim 2, wherein said spoiler assembly means is moved from said neutral condition through said angular displacement in response to manual movement of said control input means throughout only a portion of the total movement range of said control input means in either alternate opposite direction from the neutral condition associated with normally stabilized flight, said range portion being from $\frac{1}{10}$ to $\frac{1}{5}$ of said total movement range.

5. The invention defined by claim 1, wherein said spoiler assembly means surface members are positioned in each wing means outboard region in an aligned planar relation, said surface members each having a sector-like elevational configuration and a joined bearing configuration wherein the maximum combined elevational dimension is essentially just less than the clearance distance between said wing means upper and lower mold line surface portions adjacent thereto.

6. The invention defined by claim 5, wherein said sector-like surface members are mounted for rotation about axes that are generally parallel to the aircraft longitudinal axis and that are spaced apart as between adjacent axes by a fixed distance, said fixed distance being essentially just greater than the clearance distance between said wing means upper and lower mold line surface portions adjacent thereto.

References Cited by the Examiner

UNITED STATES PATENTS 2,821,352   1/1958   Phillips _____ 244—90

MILTON BUCHLER, *Primary Examiner.*

A. H. FARRELL, *Assistant Examiner.*